United States Patent [19]

Kamitake et al.

[11] Patent Number: 4,931,979
[45] Date of Patent: Jun. 5, 1990

[54] ADDING APPARATUS HAVING A HIGH ACCURACY

[75] Inventors: Takashi Kamitake, Irvine, Calif.; Shin-ichi Kawamura, Yokohama; Masahiro Abe, Tokyo, both of Japan

[73] Assignee: Kabushiki Kaisha Toshiba, Kawasaki, Japan

[21] Appl. No.: 236,902

[22] Filed: Aug. 26, 1988

[30] Foreign Application Priority Data

Dec. 25, 1987 [JP] Japan .............................. 62-327176

[51] Int. Cl.⁵ .............................................. G06F 7/50
[52] U.S. Cl. .................................... 364/745; 364/733
[58] Field of Search ..................... 364/745, 748, 733

[56] References Cited

U.S. PATENT DOCUMENTS 4,750,146  6/1988  Dalqvist et al. .................... 364/745
4,758,972  7/1988  Frazier ................................ 364/745
4,796,217  1/1989  Takahashi et al. ................. 364/745

Primary Examiner—David H. Malzahn
Attorney, Agent, or Firm—Foley & Lardner, Schwartz, Jeffery, Schwaab, Mack, Blumenthal & Evans

[57] ABSTRACT

An apparatus for adding a first input value and a second input value smaller than the first input value comprises a memory device for memorizing an under flow component; a first adder for adding an output value from the memory device and the first input value; a second adder for adding an output value of the first adder and the second input value; a first subtracter for subtracting the second input value from an output value of the second adder; and a comparator for comparing the output value of the first adder and an output value of the first subtracter. It is judged by an output value of the comparator whether or not the output value of the first adder is memorized in the memory device.

3 Claims, 4 Drawing Sheets

ADDING APPARATUS HAVING A HIGH ACCURACY

The present invention relates to an adding apparatus having a high accuracy for improving an adding accuracy in digital signal processing for performing floating point arithmetic of a finite word length.

BACKGROUND OF THE INVENTION

FIG. 1 shows the configuration of a conventional floating point arithmetic adder which performs floating point arithmetic of a finite word length digital signal. At first, let us consider a case where the absolute values of two inputs are very different from each other, in FIG. 1, e.g., when the absolute value of a first input 1 is much smaller than that of a second input 2. In this case, the value of the first input 1 is inputted from an input terminal 401, and the value of the second input 2 is inputted from an input terminal 402. Under such conditions, an under flow of the first value is caused, namely, some amount of value of the first input 1 is omitted at the adder 403, thereby outputting a value which includes some amount of error to an output terminal 404. The main reason of this omission is the usage of floating point arithmetic with a finite length mantissa. Namely, since a finite digit number is used, the portions of a smaller input which are not included in the range of a larger number are neglected and the under flow is thus caused. The omitted portions causes errors.

Accordingly, the floating point arithmetic adder shown in FIG. 1 suffers from problems of accuracy in the floating point adding operation when the absolute values of two inputs are greatly different from each other. The following two examples is related to such problems about the accuracy in floating point adding operation.

FIG. 2 shows the configuration of a conventional integrator as a first example. Even in this case, when the absolute value of an input from an input terminal 501 is greatly smaller than that of a value of a memory circuit 503, the under flow sometimes occurs. FIG. 4 shows an output of the integrator when a constant value is continuously inputted, in which the axis of abscissa shows time t, and the axis of ordinate shows the output of the integrator. In the period from time 0 to time $t_1$ of FIG. 4, the absolute value of the memory circuit 503 in the integrator of FIG. 2 is not so larger than that of the input value. Thus, no fatal under flow is caused. During this period, the floating point adder 502 outputs the floating point added result without fatal under flow, so that the value of the memory circuit 503 in the integrator proportionally increases in accordance with time. When the output of the integrator becomes very large in comparison with the input data, the under flow is caused from a certain time. When the under flow is caused from time $t_1$, the value of the memory circuit 503, which is the output of the integrator, after time $t_1$ is not changed because of the under flow, thereby holding it at a constant value. The difference between the constant value and an ideal value of the output of the integrator designated by dotted line becomes large in accordance with time, and the accumulated error caused by the under flow becomes an infinite value after an infinite time has passed, thereby greatly reducing the accuracy of the integrator.

FIG. 3 shows the configuration of a second order loop filter often used in a conventional PLL(Phase Locked Loop). Even in this case, when the absolute value of an input from an input terminal 601 is greatly smaller than that of a value of a memory circuit 606, or when coefficients α 602 and β 603 of the loop filter are very small, the input is not added exactly in adders 604 and 605, thereby causing under flow. The process of the under flow in the floating point adding operation is similar to the one in the integrator mentioned above.

In processing a digital signal, the error caused by under flow of the adder in the floating point arithmetic is a big problem. Thus, the integrator, the loop filer, etc. should have an adequate accuracy.

As mentioned above, in the adding apparatus which performs an addition of two input values with floating point, the under flow is caused when the difference between the absolute values of the two inputs is very large.

SUMMARY OF THE INVENTION

To overcome the problems mentioned above, an object of the present invention is to provide an adding apparatus which performs the adding operation of the two floating point inputs, in which the under flow can be prevented even when the difference between the absolute values of the two inputs is large, thereby obtaining an operating result having a high accuracy.

With the above object in view, the present invention resides in an adding apparatus for adding first and second input values at any time in which the first input value is smaller than the second input value, said adding apparatus comprising memory means for memorizing an under flow component, first adding means for adding the first input value and a value outputted from the memory means, second adding means for adding the second input value and an output value of the first adding means, first subtracting means for subtracting the second input value from an output value of the second adding means, and means for comparing the output value of the first adding means and an output value of the first subtracting means, whereby the output value of the first adding means is memorized in the memory means by the output of the comparing means.

The first input value and the output value from the memory means for memorizing the under flow component are added by the first adding means. The output value of the first adding means and the second input value are added by the second adding means. The output value of the second adding means and the second input value are compared with each other by the comparing means. By this comparison, it can be judged whether or not the first and second input values are added to each other. If the two input values are not added to each other, an amount to be added is accumulatively added to the memory means. This accumulated value is added to the first input value by the first adding means. By such an operation, even when the under flow is caused, the amount for the under flow is accumulatively added, thereby providing an adding apparatus having a high accuracy with very little under flow.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will be described next with reference to the accompanying drawings.

Figure 5:
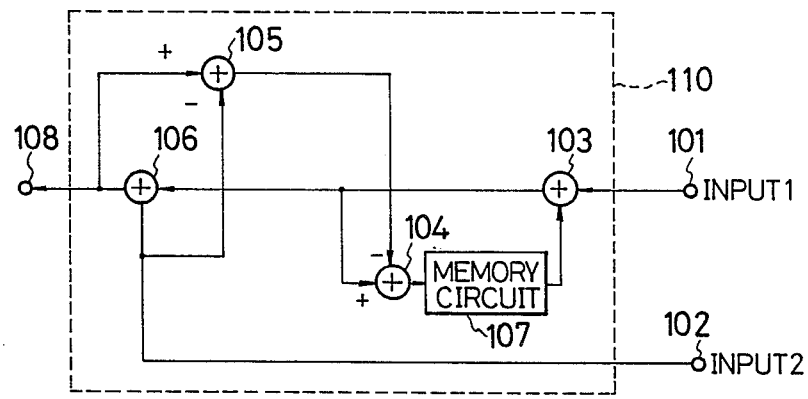
FIG. 5 is a block diagram showing an adding apparatus in accordance with one embodiment of the present invention.

FIG. 5 shows the configuration of an adding apparatus in accordance with one embodiment of the present invention. When the difference between the absolute values of two inputs of an adder is large and under flow is thereby caused. The under flowed portion of a smaller absolute value, which is not added and thereby omitted in the adding operation, is inputted to a memory circuit, and the under flowed portion of the input value is accumulatively added in the memory circuit. Though each under flowed portion is small as compared with the value at the terminal 102 in FIG. 5, the accumulated value of them (107) will become comparable with that value 102. Then, the comparable portion of the value in memory circuit 107 is added to the value of input 2.

FIG. 5 shows the configuration of the adding apparatus for providing such an operation. One embodiment of the present invention will be next described in detail using FIG. 5. Input values of inputs 1 and 2 are inputted to an adding apparatus 110 from input terminals 101 and 102, respectively. The input values of the inputs 1 and 2 are represented by floating points. The value having the smaller absolute value in comparison with the input terminal 102 is inputted to the input terminal 101. For example, it is assumed that value 0.001 is inputted from the input 1, and value 1000 is inputted from the input 2 in the following description. The value 0.001 from the input 1 is added to the value memorized in a memory circuit 107 by an adder 103. An output value of the adder 103 is inputted to a subtracter 104 and an adder 106. At this time, no value is initially memorized in the memory circuit 107. The output of the adder 103 and the value 1000 of the input 2 are added to each other by the adder 106, and the added result is outputted to a subtracter 105 and an output terminal 108. At this time, the added value of 1000 and 0.001 is outputted as an added output. However, value 0.001 is too small in comparison with value 1000, and it is therefore assumed in the following description that value 0.001 is omitted, thereby causing under flow. Accordingly, value 1000 is outputted as an added output. The subtracting circuit 105 subtracts the added result 1000 from value 1000 of the input 2, and thereby outputs value 0. This output value is inputted to the subtracter 104, and is subtracted from the output 0.001 from the adder 103. As a result, value 0.001 is inputted to the memory circuit 107. The value 0.001 is outputted from the memory circuit 107, and is added to the next value inputted from the input terminal 101 by the adder 103. By such a construction, when under flow is caused in the adder 106, the under flowed value is stored in the memory circuit 107, and is simultaneously added at the time of the next adding operation. Accordingly, even when the difference between the absolute values of the two inputs is large, the under flow can be compensated for.

Two cases will be described next: one is the case when under flow occurs, and the other is the case when it does not. In the first case, under flow of the adder 106 occurs. In this case, all or a part of the output value from the adder 103 is under flowed at the adder 106. The subtracter 105 subtracts the value of the input 2 from the output of the adder 106, and outputs the subtracted result to the subtracter 104. The subtracter 104 subtracts the output value of the subtracter 105 and the output value of the adder 103. The output value of the subtracter 104 constitutes under flow component and is memorized in the memory circuit 107. At the time of the next adding operation, the value from the input 1 and the output value from the memory circuit 107 are added to each other by the adder 103. Accordingly, the accumulated sum of the under flow value is added in the next adding operation at adder 106.

When under flow is not caused, the adder 106 adds the values from the inputs 1 and 2 without under flow. The subtracter 105 subtracts the value of the input 2 from the output of the adder 106, outputting the value of the input 1 to the subtracter 104. The subtracter 104 subtracts the output of the subtracter 105 from the output of the adder 103. Namely, the same values are subtracted from each other so that value 0 is inputted to the memory circuit 107. Thus, the content of the memory circuit 107 is 0.

Figure 1:
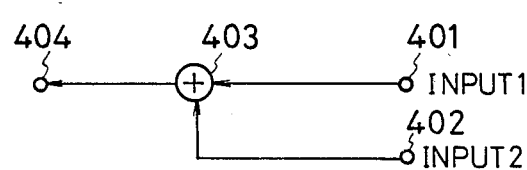
FIG. 1 is a block diagram showing the configuration of a conventional adder.
Figure 2:
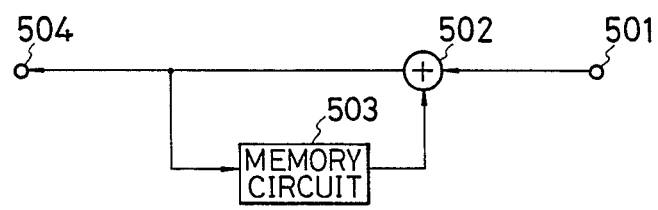
FIG. 2 is a view showing a conventional integrator.
Figure 6:
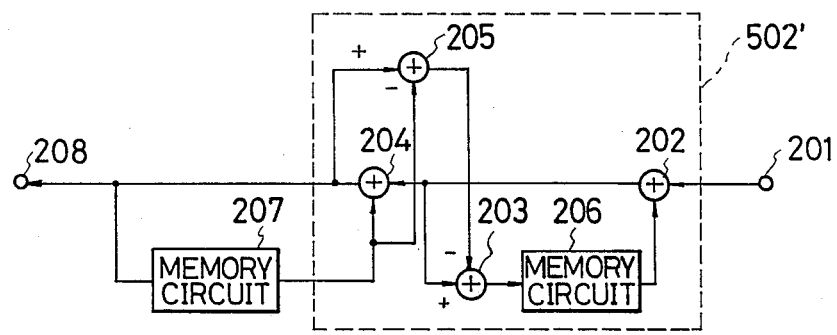
FIG. 6 is a view showing an integrator using the adding apparatus of FIG. 5 and corresponding to FIG. 2.

FIG. 6 shows an embodiment of an integrator using the adding apparatus of the present invention. A block portion 502' of FIG. 6 corresponds to the adder 502 of FIG. 2. An input signal is inputted to an input terminal 201 connected to an adder 202. The adder 202 is connected to a subtracter 203 and an adder 204. The adder 204 is connected to an output terminal 208, a memory circuit 207 and a subtracter 205. An output of the memory circuit 207 is supplied to the adder 204. The subtracter 205 subtracts the output of the memory circuit 207 from an output of the adder 204, and outputs the subtracted result to the subtracter 203. The subtracter 203 subtracts the output of the subtracter 205 from the output of the adder 202, and outputs the subtracted result to the memory circuit 206. In FIG. 6, the input 1 shown in FIG. 5 corresponds to the input terminal 201, and the input 2 corresponds to the output value of the memory circuit 207.

Figure 8:
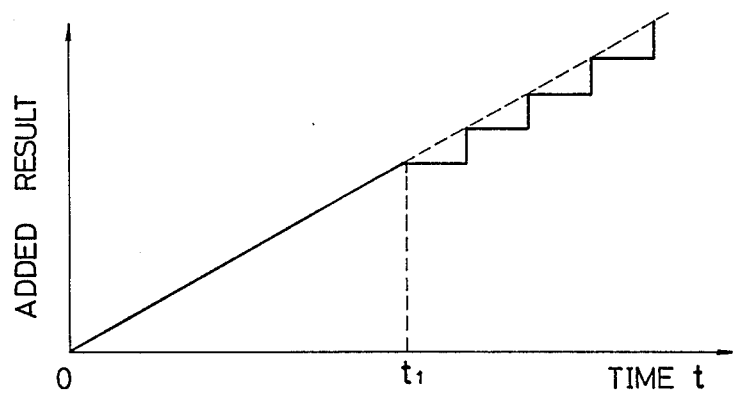
FIG. 8 is a view showing the added result of the integrator of FIG. 6.
Figure 9:
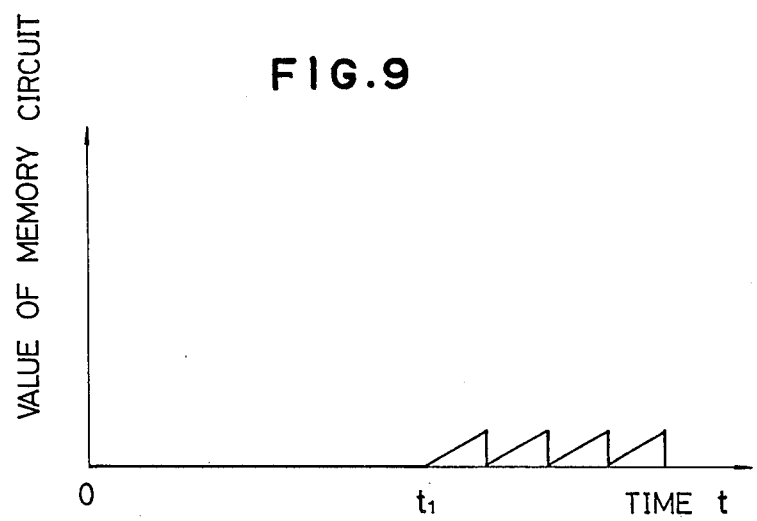
FIG. 9 is a view showing a value in a memory circuit of the present invention with respect to time.

The added results will be considered next with reference to FIG. 8 showing the change in the output value of the output terminal 208 with respect to time, and FIG. 9 showing the change in the output value of the memory circuit 206 with respect to time. When the under flow is not caused, this situation corresponds to the region until time $t_1$ of FIGS. 8 and 9. In this region, no under flow is performed with respect to the added result shown in FIG. 8, and the output value of the memory circuit shown in FIG. 9 is held at value 0.

Figure 4:
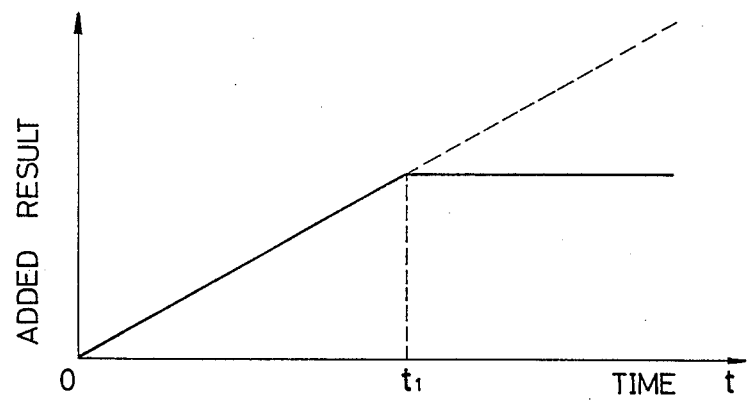
FIG. 4 is a view showing an output of the integrator of FIG. 2.

When under flow is caused, this situation corresponds to the region after time $t_1$ in FIGS. 8 and 9. In this region, the conventional added result is not changed and becomes constant after time $t_1$ as shown in FIG. 4. However, in the integrator using the present invention, the added result increases stepwise after time $t_1$ as shown in FIG. 8. A stepwise horizontal portion corresponds to a state in which the under flow is caused in the adder 204 of FIG. 6. At this time, the value of the memory circuit 206 corresponds to a proportionally increasing portion having a constant inclination in the region after time $t_1$ of FIG. 9. In this state, when the accumulatively added value of the memory circuit 206 sufficiently becomes large such that the under flow is not caused, the accumulated sum of the under flow becomes an addable value by the adder 204 at this time. This state corresponds to a vertical line portion of the stepwise portion of FIG. 8. At this time, the value of the memory circuit 206 is cleared to value 0, which corresponds to a state from a proportionally increasing top portion having the constant inclination in the region after $t_1$ of FIG. 9 to a vertical line portion falling value 0. As mentioned above, the added result shown in FIG. 8 has a stepwise value and thereby becomes a value approximately equivalent to an ideal value shown by dotted line. Accordingly, by using the construction of the adder of the present invention, the integrator of FIG. 6 is improved with respect to accuracy in operation by integrating the input with less under flow.

Figure 3:
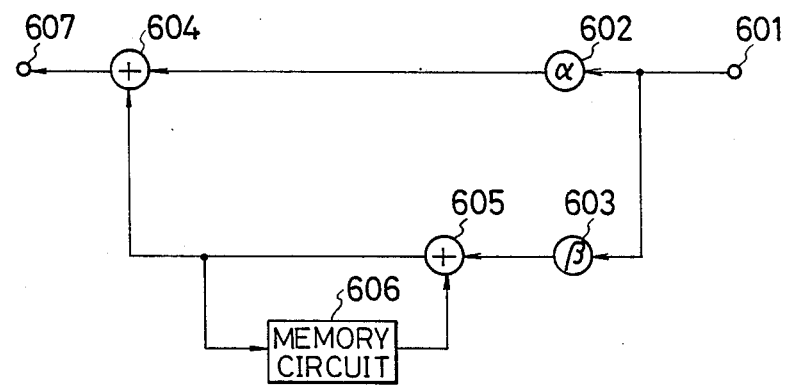
FIG. 3 is a view showing a conventional loop filter.
Figure 7:
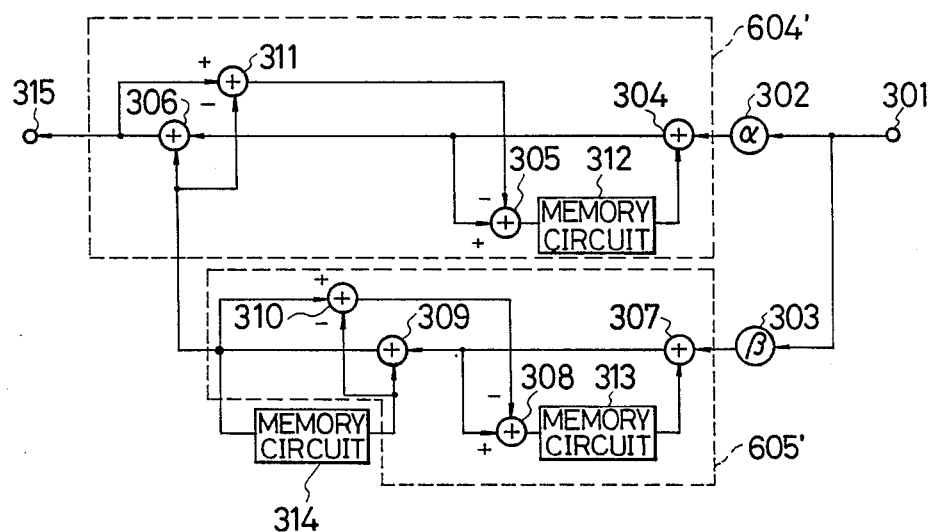
FIG. 7 is a view showing a loop filter using the adding apparatus of FIG. 5 and corresponding to FIG. 3.

FIG. 7 shows an embodiment of a loop filter using the adding apparatus of the present invention. In FIG. 7, block portions 604' and 605' correspond to adders 604 and 605 of FIG. 3, respectively. An input terminal 301 is connected to coefficient multipliers 302 and 303.

The coefficient multiplier 302 is connected to an adder 304 connected to a subtracter 305 and an adder 306. The subtracter 305 is connected to a memory circuit 312 connected to an adder 304.

The coefficient multiplier 303 is connected to an adder 307 connected to a subtracter 308 and an adder 309. The subtracter 308 is connected to a memory circuit 313 connected to the adder 307. The adder 309 is connected to a subtracter 310, a memory circuit 314 and the adder 306. The subtracter 310 subtracts an output of the memory circuit 314 from an output of the adder 309, and outputs the subtracted result to the subtracter 308. The subtracter 308 subtracts an output of the subtracter 310 from an output of the adder 307, and outputs the subtracted result to the memory circuit 313.

Outputs of the adders 304 and 309 are inputted to the adder 306, and the added input is outputted to an output terminal 315. The subtracter 311 subtracts the output of the adder 309 from an output of the adder 306, and outputs the subtracted result to the subtracter 305. The subtracter 305 subtracts the output of the subtracter 311 from the output of the adder 304, and outputs the subtracted result to the memory circuit 312.

When the adding apparatus of the present invention mentioned above is used, the adding operation can be performed with little under flow with respect to the adders 306 and 309 in the loop filter of FIG. 7 even when the absolute value of an input is sufficiently smaller than that of a value of the memory circuit 314, thereby providing a loop filter having a high accuracy.

As mentioned above, in accordance with the present invention, in the two input floating point arithmetic of a finite word length in the digital signal processing, the under flow amount in the adding operation can be again added later by using memory means for memorizing an under flow amount accumulatively added even when the absolute values of the two inputs are greatly different from each other. Accordingly, the adding operation with less under flow can be performed, thereby providing the calculated result having a high accuracy.

What is claimed is:

1. An apparatus for adding a first input value representing a floating point number and a second input value representing another floating point number greater than that represented by the first input value to obtain a sum of the first and second input values, comprising:
    memory means for memorizing an underflowing value;
    first adder means for adding the underflowing value and the first input value to obtain an intermediate value;
    second adder means for adding the intermediate value and the second input value to obtain their sum;
    first substractor means for subtracting the second input value from the sum to obtain a reference value; and
    second subtractor means for subtracting the reference value from the intermediate value to obtain the underflowing value to be memorized in the memory means.

2. The apparatus of claim 1, wherein the sum obtained by the second adder means is taken for the second input value to be entered into the second adder means in subsequent adding by the apparatus.

3. The apparatus of claim 1, further comprising:
    first coefficient multiplier means for multiplying an input signal by a first coefficient to obtain the first input value;
    second coefficient multiplier means for multiplying an input signal by a second coefficient to obtain an additional input value;
    additional memory means for memorizing an additional underflowing value;
    third adder means for adding the additional underflowing value and the additional input value to obtain an additional intermediate value;
    fourth adder means for obtaining the second input value by adding the additional intermediate value and the second input value obtained by a previous adding by the fourth adder means;
    third subtractor means for subtracting the second input value from the second input value obtained by the previous adding by the fourth adder means to obtain an additional reference value; and
    fourth subtractor means for subtracting the additional reference value from the additional intermediate sum to obtain the additional underflowing value to be memorized in the additional memory means.

* * * * *